May 28, 1935. L. M. DALY 2,003,175
ELECTRIC HEATER
Filed Aug. 12, 1933
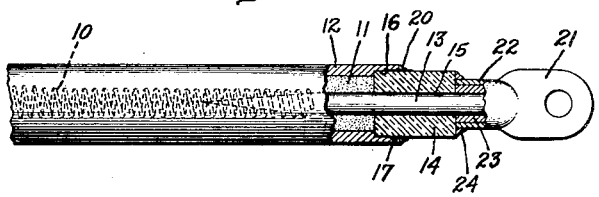
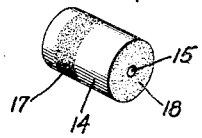
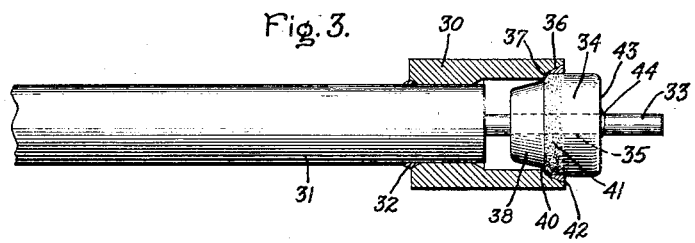
Inventor:
Loretta M. Daly,
by Harry E. Dunham
Her Attorney.

Patented May 28, 1935

2,003,175

UNITED STATES PATENT OFFICE 2,003,175

ELECTRIC HEATER

Loretta M. Daly, Pittsfield, Mass., assignor to General Electric Company, a corporation of New York Application August 12, 1933, Serial No. 684,839

3 Claims. (Cl. 201—67)

My invention relates to electric heaters and the like, and it has for its object the provision of improved method and means for sealing the terminals of heaters of this type.

Although not limited thereto, my invention has particular application to electric heaters of the encased or sheathed type, such as described and claimed in the United States Patent No. 1,367,341 to C. C. Abbott, dated February 1, 1921. As there described, heaters of this type comprise a resistance conductor embedded in an insulating material and enclosed by an outer metallic protective casing.

In one of its aspects, my invention contemplates the provision of improved means for sealing the terminals of electric heaters of this type whereby the heaters are rendered impervious to moisture, oil, gas and like fluids.

In accordance with my invention, I surround each terminal of the heater with an insulating body formed of some suitable material, such as porcelain. This body may be in the form of a sleeve that is provided with an aperture for receiving the terminal.

In one form of my invention, these sleeves are received in the terminal ends of the metallic sheath. Fluid-impervious metallic joints are provided between the insulating sleeves and the sheath and also between the sleeves and the terminals to which they are applied.

In another form of my invention, the insulating sleeves are received in metallic cup-shaped casings that are applied to the ends of the sheath, and metallic fluid impervious joints are provided between the sleeves and the casings, as well as between the sleeves and the terminals to which the sleeves are applied. In this case, fluid-tight joints are also provided between the casings and the sheath.

The fluid-impervious metallic joints between the insulating sleeves and the terminals and between the sleeves and the surrounding casings or sheath may be made in any suitable manner, but preferably will be formed by coating the insulating sleeves with layers of metal, suitably located, and then after the insulating sleeves have been assembled to their terminals, uniting these layers into homogeneous structures both with the terminal and with the surrounding sheath or casing. This last step can be accomplished by soldering, or brazing or by some similar operation. Any suitable metal may be used to form the metallic coatings on the insulating sleeves, but preferably platinum or a suitable platinum alloy will be used.

For a more complete understanding of this invention reference should be had to the accompanying drawing in which Fig. 1 is a fragmentary elevation of a sheathed electric heater provided with terminals sealed in accordance with my invention, portions being shown in section so as to illustrate certain details of construction; Fig. 2 is a perspective view of an insulating sleeve used to make the terminal seal of the heater of Fig. 1; and Fig. 3 is a fragmentary elevation illustrating a modified form of my invention, portions being shown in section so as to illustrate certain details of construction.

Referring to the drawing, I have shown my invention as applied to a helical coil sheathed electrical heating unit of the type described and claimed in the above-mentioned Abbott patent.

As shown in Fig. 1, this heating unit comprises a helical resistance conductor 10 embedded in a compacted mass of powdered heat refractory electrically insulating material 11, the conductor and insulating material being encased by a metallic sheath 12.

The insulating material 11 may be any suitable substance, but preferably will be formed of powdered magnesium oxide. This material may be compacted to a hard dense mass having a good heat conductivity in any suitable manner, such as by reducing the diameter of the sheath after the unit has been assembled and the sheath has been loaded with the magnesium oxide. The sheath may be reduced by swaging or rolling.

The resistance conductor 10 extends through a considerable portion of the length of the sheath 12 and has its two ends connected to terminal members 13 (only one of which is shown), which members project from the ends of the sheath.

While the resistance conductor 10 may be connected to its terminals 13 in any suitable manner, I prefer to connect them in the fashion described and claimed in United States Patent No. 1,494,938 to C. C. Abbott, dated May 20, 1924. As there described, the terminal members 13 have their inner ends threaded and are electrically and mechanically connected with the resistance conductor 10 by screwing a number of the end turns of the conductor onto the threaded ends of the terminals. In this arrangement, the terminals have a diameter slightly greater than the diameter of the helix of the conductor 10 so that when the conductor is turned on the terminal, the coil will contract onto the terminal thereby providing a very good electrical and mechanical connection between the conductor and the terminals.

In making the heating unit thus far described, the terminals 13 are attached to the conductor 10 in the manner described, and then the conductor with the terminals attached is threaded through the sheath 12. The sheath is then loaded with the magnesium oxide 11 in any suitable manner, and then its diameter is reduced, as by swaging or by rolling.

In order to render the heater absolutely impervious to the passage of fluids through the terminals, I surround each terminal with a layer or a sleeve 14 formed of some suitable electrically insulating material, such as porcelain. The porcelain sleeves 14, as shown, are provided with centrally arranged apertures 15 for receiving the terminals. Preferably, the ends of the sheath will be provided with recesses or counterbores 16 (only one shown) for receiving the inner end portions of the porcelain sleeves 14.

Suitable fluid-tight metallic joints are provided between the porcelain sleeves 14 and the sheath 12 and also between the porcelain sleeves and the terminal members 13.

To accomplish this, each porcelain sleeve 14 is provided with coats or layers of metal suitably located so that after the insulating sleeve is assembled with the heater, as shown in Fig. 1, the layers can be united with the terminals and sheath so as to provide the fluid-tight joints. As shown in Fig. 2, the porcelain sleeve 14 is provided with a layer of metal 17 of band-shape encircling the sleeve adjacent its inner end, that is adjacent its end that is received in the counterbore 16, and on its outer face at the opposite end is provided with another layer of metal 18.

It will be understood that these layers of metal 17 and 18 may be applied to the sleeve 14 in any suitable manner. Thus they may be formed by any well-known metallizing process. For example, if the layers are formed of platinum, they may be applied by any well-known platinizing process. The important features are that the metal be applied by some method which will practically integrally unite the metal with the porcelain sleeves, and that the metal applied be of such a character that it can be united with the metal forming the terminals 13 and the metallic sheath 12.

The metal band 17 is applied to the porcelain sleeve so that when the sleeve is assembled with the sheath, as shown in Fig. 1, the major portion of the band will be exterior of the sheath, but a small portion will be surrounded by the end wall portion of the sheath.

After the sleeve 14 has been assembled with the heater, as shown in Fig. 1, the band 17 is soldered or brazed to the sheath so as to form a fluid-tight metallic joint 20 with the sheath. It will be understood that this soldering or brazing operation will provide a substantially homogeneous metallic joint between the porcelain sleeve and the metallic sheath. As a matter of fact, this metallic joint between the porcelain sleeve and the sheath is as strong as, or even stronger than is the porcelain sleeve itself.

The surface 18, as previously pointed out, is used to make a metallic joint between the terminal 13 and the porcelain sleeve. For this purpose, a connector member 21 having a cup-shaped base 22 is applied to the terminal 13, as shown in Fig. 1. Preferably, a suitable metallic sleeve 23 will be inserted over the terminal before the cup is applied, this sleeve being so proportioned that it will have a substantially tight fit both with the terminal and with the inner walls of the cup. Then the metallic cup 22 is soldered or brazed to the metallic layer 18 so as to provide a fluid-impervious joint 24 between these members.

It will be observed that the metallic joint 24 is insulated from the sheath by the body of the insulating sleeve itself, and that the metallic joint 20 is insulated from the terminal by means of the sleeve 14. Moreover, the metallic band 17 is electrically insulated from the metallic surface 18 by means of the insulating sleeve 14. It will be observed that the portion of the sleeve 14 between the metal surfaces 17 and 18 and the joints 20 and 24 is of considerable length so as to practically prevent any electrical creepage between the terminal and the sheath.

If desired, the cup-shaped terminal 21, 22 may be dispensed with, and the terminal may be directly soldered to the metal layer 18.

In Fig. 3 a modified form of my invention is shown wherein a cup-shaped casing or receptacle is used to receive the insulating sleeve. As shown in Fig. 3, a cylindrical casing 30 is fitted to the end portion of the sheath 31. It will be understood that this sheath 31 corresponds to the sheath 12 of Fig. 1. The cup 30 is secured to the sheath 31 by means of a brazed joint 32 which provides a fluid-tight connection between these members.

The terminal 33 for the heater passes through the cup 30 and extends for some distance beyond the mouth of the cup.

Inserted in the mouth of the cup is an electrically insulating sleeve 34 formed of some suitable material, such as porcelain. This sleeve, as shown, is provided with a centrally arranged aperture 35 for receiving the terminal. Preferably, the mouth of the receptacle 30 will be tapered as indicated at 36, the taper terminating in a seat 37 for receiving the insulator. The insulator preferably will be formed with the tapered portion 38 which extends for some distance into the receptacle 30, and the insulator will be provided with a ledge 40 which rests upon the seat or shoulder 37. This projecting portion 38 increases the electrical creepage space between the terminal 33 and the metallic casing 30.

Fluid-tight metallic joints are provided between the insulator 34 and the receptacle 30 and between the insulator and the terminal 33. For this purpose, the insulator 34 is provided with a metal coating 41 surrounding that portion of the insulator which is received within the recess 36. As shown, this metallic band 41 has a width substantially equal to the depth of the recess. This metal coating is applied to the insulator in any suitable manner, such as that described in connection with the application of the metal coatings 17 and 18 to the insulator 14. The coating 41 is soldered to the walls of the receptacle so as to form a fluid-impervious metallic joint 22 between these members.

The outer end surface of the insulator is provided with a metallic coating 43 similar to the coating 18 applied to the insulator 14. This coating 43 is soldered to the terminal 33 so as to provide a fluid-impervious metallic joint 44 between these members.

It will be observed that the receptacle 30 is connected to the sheath 31 by means of the fluid-tight joint 32, while the insulating sleeve 34 is connected to the receptacle 30 by means of the fluid-tight joint 42 and with the terminal by the fluid-tight joint 44.

It will be understood that any suitable terminal connector may be secured to the portion of the terminal 33 that projects from the insulating sleeve 34.

The form of my invention shown in Fig. 3 is described and claimed specifically in my copending application Serial No. 752,433, filed November 10, 1934, which application is a division of the instant application, and which is assigned to the same assignee as this invention.

The terminal seals arranged in accordance with this invention effectively close the terminal ends of the heating unit. The terminal seals effectively prevent the admission of fluids into the sheath. It is to be understood, however, that these seals may be used just as effectively to retain a selected atmosphere in the sheath, such as an atmosphere for preserving the life of the resistance heating element. Thus, for example, the seals may be used to retain a non-oxidizing or reducing atmosphere in the sheath to protect the heating element.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent in the United States is:

1. An electric heater comprising a resistance conductor, a metallic sheath encasing said conductor, an electrically insulating sleeve arranged within said sheath and having a portion projecting from said sheath, a terminal for said resistance conductor mounted within an aperture provided for it in said sleeve and projecting from said sleeve on the exterior of said sheath, a metallic band surrounding a portion of said sleeve within said sheath and rigidly secured to said sleeve, a metallic layer covering the outer surface of said sleeve and rigidly secured to said sleeve, and metallic masses united into substantially homogeneous structures with said metallic band and the inner walls of said sheath and said metallic surface covering the end of said sleeve and said terminal, whereby a fluid-tight joint is effected between said sheath and said terminal.

2. An electric heater comprising a resistance conductor, a metallic sheath encasing said conductor, electrically insulating material within said sheath embedding said resistance conductor and supporting it in spaced relation with said sheath, an electrically insulating sleeve formed of porcelain arranged within said sheath and having a portion projecting from said sheath, a terminal for said resistance conductor mounted within an aperture provided for it in said sleeve and projecting from said sleeve on the exterior of said sheath, a metallic band surrounding the portion of said sleeve within said sheath and rigidly secured to said sleeve, a metallic layer covering the outer surface of said sleeve, and rigidly secured to said sleeve, a substantially cup-shaped connector member covering the portion of said terminal projecting from said sleeve, a metallic mass united into a substantially homogeneous metallic structure with said metallic band and the inner walls of said sheath, and a metallic mass united into a substantially homogeneous metallic structure with said cup-shaped connector member and said metallic layer on the outer end of said sleeve, whereby a fluid-tight joint is effected between said sheath and said terminal.

3. The method of sealing the terminal end of an electric heater provided with a resistance conductor, a terminal and a metallic casing surrounding said terminal which comprises providing an insulating sleeve arranged to be threaded onto said terminal and received in the end of said casing, coating the outer surface of said sleeve with a band of metal surrounding said sleeve where it fits into said casing, coating one end surface of said sleeve with a layer of metal, threading said sleeve onto said terminal with the coated end surface of said sleeve remote from said casing while the other end of said sleeve enters said casing and then uniting said metallic band into a substantially homogeneous metallic structure with the walls of said casing and said coating on the outer end of said sleeve into a substantially homogeneous metallic structure with said terminal.

LORETTA M. DALY.